US012591940B2

(12) United States Patent
Uyeki

(10) Patent No.: US 12,591,940 B2
(45) Date of Patent: Mar. 31, 2026

(54) CREDIT AND REWARDS PROGRAM FOR ELECTRIC VEHICLE USERS BASED ON CLEAN ENERGY USAGE

(71) Applicant: Honda Motor Co., Ltd., Tokyo (JP)

(72) Inventor: Robert M Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/804,822

(22) Filed: Aug. 14, 2024

(65) Prior Publication Data

US 2026/0051003 A1 Feb. 19, 2026

(51) Int. Cl.
*G06Q 30/0207* (2023.01)
*G06Q 30/018* (2023.01)
*G06Q 50/06* (2012.01)

(52) U.S. Cl.
CPC .......... *G06Q 50/06* (2013.01); *G06Q 30/018* (2013.01); *G06Q 30/0207* (2013.01)

(58) Field of Classification Search
CPC ................ G06Q 50/06; G06Q 30/018; G06Q 30/0207–0277
USPC ............................................ 705/14.1–14.73
See application file for complete search history.

(56) References Cited

U.S. PATENT DOCUMENTS

| | | | |
|---|---|---|---|
| 8,301,365 B2 | 10/2012 | Niwa et al. | |
| 9,024,571 B2 | 5/2015 | Uyeki | |
| 9,428,067 B2 | 8/2016 | Nakagawa et al. | |
| 9,457,680 B2 | 10/2016 | Shinzaki et al. | |
| 10,647,209 B2 | 5/2020 | Haas et al. | |
| 11,315,140 B2 | 4/2022 | Muramatsu et al. | |
| 2011/0276194 A1 | 11/2011 | Emalfarb et al. | |
| 2012/0249065 A1 | 10/2012 | Bissonette et al. | |
| 2014/0098671 A1* | 4/2014 | Raleigh .................. | G06Q 40/12 370/235 |
| 2014/0214321 A1* | 7/2014 | Kawamata ......... | G01C 21/3476 340/901 |

(Continued)

FOREIGN PATENT DOCUMENTS

| | | |
|---|---|---|
| WO | 2020208655 A1 | 10/2020 |
| WO | 2023148620 A1 | 8/2023 |

OTHER PUBLICATIONS

Connecticut Green Bank, "electric vehicle charging carbon credits", retrieved from https://www.ctgreenbank.com/investment-solutions/ev-charging-carbon-credits/, available on Apr. 16, 2024 (Year: 2024).*

*Primary Examiner* — Sam Refai

(74) *Attorney, Agent, or Firm* — Aaron Fong; American Honda Motor Co., Inc.

(57) ABSTRACT

A system and a method for allocating energy credits is provided. The system includes circuitry that identifies a vehicle identifier associated with an electric vehicle and retrieves usage data comprising battery charging records for the electric vehicle. Each record includes a charging time-period, quantity of electrical power used, and geographic location. The circuitry determines a carbon intensity score for the electrical power consumed during each charging time-period based on the usage data. An adjusted quantity of electrical power for allocation of energy credits is determined based on the carbon intensity score and usage data. The circuitry transmits a request to an energy credit provider for allocation of energy credits against the vehicle identifier based on the adjusted quantity.

20 Claims, 6 Drawing Sheets

(56) References Cited

U.S. PATENT DOCUMENTS

| 2016/0035001 A1 * | 2/2016 | Driscoll ............. | G06Q 30/0631 |
| | | | 705/26.7 |
| 2022/0097551 A1 * | 3/2022 | Dow ........................ | B60L 53/68 |
| 2023/0143398 A1 | 5/2023 | Ito et al. | |
| 2023/0158917 A1 * | 5/2023 | Uyeki ..................... | B60L 55/00 |
| 2023/0306092 A1 * | 9/2023 | Yahata ................... | B60R 25/24 |
| 2023/0356617 A1 | 11/2023 | Belur et al. | |
| 2023/0356618 A1 | 11/2023 | Belur | |
| 2024/0010099 A1 * | 1/2024 | Peterman ............... | G06Q 10/04 |
| 2024/0034180 A1 * | 2/2024 | Bhimani ................ | B60L 58/13 |
| 2024/0035836 A1 * | 2/2024 | Salako ................. | B60W 40/09 |
| 2024/0144261 A1 * | 5/2024 | Lu ........................... | G06Q 50/40 |
| 2024/0303586 A1 * | 9/2024 | Lang ................... | G06Q 30/018 |
| 2024/0418527 A1 * | 12/2024 | Dave ................. | G01C 21/3617 |

* cited by examiner

CREDIT AND REWARDS PROGRAM FOR ELECTRIC VEHICLE USERS BASED ON CLEAN ENERGY USAGE

BACKGROUND

The adoption of electric vehicles (EVs) has been steadily increasing as a means to reduce carbon emissions and dependence on fossil fuels. However, the environmental benefits of EVs are closely tied to the source of electricity used for charging. Many EV owners are unaware of the carbon intensity of the electricity they use to charge their vehicles, which can vary significantly based on the time of day and location. Additionally, existing incentive programs for EV adoption often fail to consider the actual environmental impact of charging behavior. This lack of awareness and targeted incentives can lead to suboptimal charging practices that may not fully realize the potential environmental benefits of EVs.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a system. The system includes circuitry that may identify a vehicle identifier associated with an electric vehicle and may retrieve usage data comprising a plurality of battery charging records for the electric vehicle based on the vehicle identifier. Each battery charging record of the plurality of battery charging records may include a charging time-period of the electric vehicle, a quantity of electrical power used to charge the electric vehicle during the charging time-period, and a geographic location of the electric vehicle during the charging time-period. The circuitry may further determine a carbon intensity score for the electrical power consumed during the charging time-period specified in each battery charging record of the plurality of battery charging records based on the usage data. Thereafter, the circuitry may determine an adjusted quantity of the electrical power for allocation of energy credits based on the carbon intensity score and the usage data. Based on the adjusted quantity, the circuitry may transmit a request for the allocation of the energy credits against the vehicle identifier to an energy credit provider.

An exemplary aspect of the disclosure provides a method. The method may include identifying a vehicle identifier associated with an electric vehicle and retrieving usage data comprising a plurality of battery charging records for the electric vehicle based on the vehicle identifier. Each battery charging record of the plurality of battery charging records may include a charging time-period of the electric vehicle, a quantity of electrical power used to charge the electric vehicle during the charging time-period, and a geographic location of the electric vehicle during the charging time-period. The method may further include determining a carbon intensity score for the electrical power consumed during the charging time-period specified in each battery charging record of the plurality of battery charging records based on the usage data. The method may further include determining an adjusted quantity of the electrical power for allocation of energy credits based on the carbon intensity score and the usage data. The method may further include transmitting a request for the allocation of the energy credits against the vehicle identifier to an energy credit provider, based on the adjusted quantity.

An exemplary aspect of the disclosure provides a non-transitory computer-readable medium having stored thereon, computer-executable instructions that when executed by a system, causes the system to execute operations. The operations may include identifying a vehicle identifier associated with an electric vehicle and retrieving usage data comprising a plurality of battery charging records for the electric vehicle based on the vehicle identifier. Each battery charging record of the plurality of battery charging records may include a charging time-period of the electric vehicle, a quantity of electrical power used to charge the electric vehicle during the charging time-period, and a geographic location of the electric vehicle during the charging time-period. The operations may further include determining a carbon intensity score for the electrical power consumed during the charging time-period specified in each battery charging record of the plurality of battery charging records based on the usage data. The operations may further include determining an adjusted quantity of the electrical power for allocation of energy credits based on the carbon intensity score and the usage data. The operations may further include transmitting a request for the allocation of the energy credits against the vehicle identifier to an energy credit provider, based on the adjusted quantity.

Figure 1:
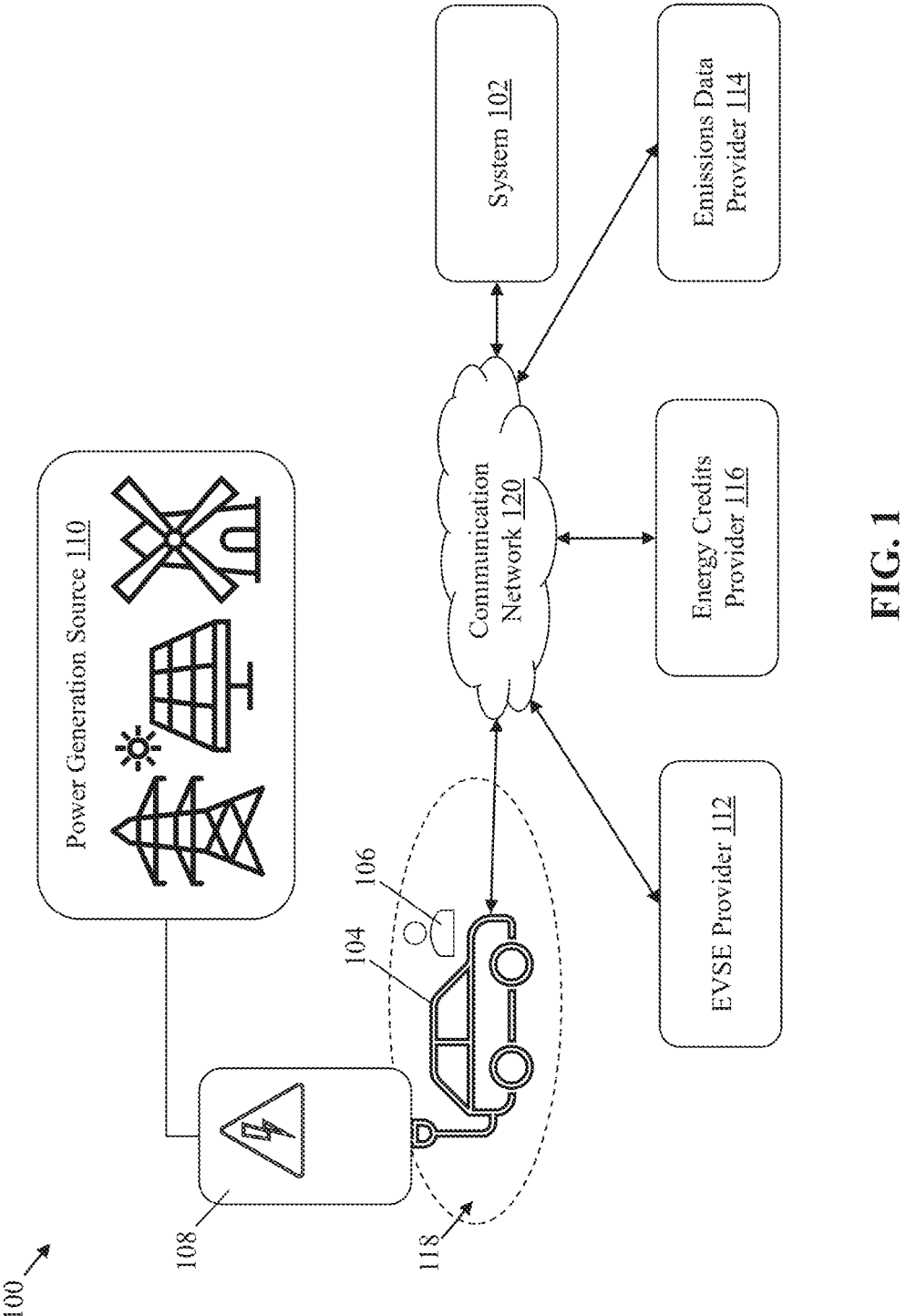
FIG. 1 is a diagram that illustrates an exemplary network environment for an electric vehicle charging and energy credit system, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system and a method for incentivizing clean energy usage in electric vehicles (EVs) through a credit and rewards program. The system may include circuitry that performs several operations related to allocating energy credits for electric vehicle charging. The system may identify a vehicle identifier for an electric vehicle and may retrieve usage data containing battery charging records. Each record may include information about the charging time-period, amount of electrical power used, and geographic location. The system may then determine a carbon intensity score for the electrical power consumed during each charging period based on the usage data. Using this score and the usage data, the system may calculate an adjusted quantity of electrical power for allocating energy credits. Finally, the system may transmit a request to an energy credit provider to allocate credits against the vehicle identifier based on the adjusted quantity of power.

The adoption of electric vehicles has been hindered by various factors, including range anxiety, charging infrastructure limitations, and the perceived complexity of EV ownership. Additionally, the environmental benefits of EVs may be diminished when charged using electricity from carbonintensive sources. These challenges have created a need for innovative solutions to encourage EV adoption and promote clean energy usage.

The disclosed electric vehicle credit and rewards system may address these challenges by providing incentives for EV users to adopt environmentally friendly charging behaviors. The system may collect and analyze data on EV usage patterns, charging habits, and the carbon intensity of the electricity used for charging. By leveraging this information, the system may allocate credits or rewards to users based on their clean energy usage and charging efficiency.

In some embodiments, the system may incorporate realtime data on the carbon intensity of the electricity grid, allowing users to optimize their charging schedules for times when cleaner energy sources are more prevalent. This feature may encourage users to shift their charging behavior to align with periods of lower carbon intensity, potentially reducing the overall environmental impact of EV charging.

The system may also integrate with various stakeholders in the EV ecosystem, including EVSE providers, OEMs, and commercial entities. This integration may facilitate data sharing, revenue models, and expanded opportunities for users to earn credits or rewards. By establishing these business relationships, the system may create a comprehensive network that supports and incentivizes clean energy usage in the EV sector.

In some aspects, the system may consider an OEM's responsibility for Scope 3 emissions, which include the emissions associated with the end use of their products. By incentivizing clean charging behavior, the system may help OEMs reduce their overall carbon footprint and meet sustainability goals.

The disclosed electric vehicle credit and rewards system may offer several potential benefits. Users may receive tangible incentives for adopting environmentally friendly charging habits, potentially reducing the cost of EV ownership. The system may contribute to increased EV adoption rates by addressing some of the perceived barriers to ownership. Additionally, the system may support broader environmental goals by promoting the use of clean energy sources and optimizing charging behavior to reduce carbon emissions.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an exemplary network environment for an electric vehicle charging and energy credit system, in accordance with an embodiment of the disclosure. With reference to FIG. 1, there is shown a network environment 100. The network environment 100 may include a system 102, an electric vehicle 104, a user 106, electric vehicle supply equipment (EVSE) 108, a power generation source 110, an EVSE provider 112, an emissions data provider 114, an energy credits provider 116, and a communication network 120. The system 102 may communicate with the electric vehicle 104, the EVSE 108, the EVSE provider 112, the emissions data provider 114, the energy credits provider 116 via one or more communication networks (such as the communication network 120). The electric vehicle 104 may be parked at a geographic location 118 for a charging session, as shown, for example.

As used herein, the system 102 may refer to a combination of hardware, software, and/or firmware components configured to perform various operations related to energy credit allocation. The system 102 may include one or more processors, memory devices, storage units, communication interfaces, and other components necessary for data processing and network communication.

In some aspects, the system 102 may be implemented as a cloud-based platform that collects, processes, and analyzes data from multiple sources. For example, the system 102 may include servers that receive charging data from electric vehicles and charging stations, process this data to calculate carbon intensity scores, and allocate energy credits based on predefined algorithms.

In some cases, the system 102 may be integrated into existing electric vehicle charging infrastructure. For instance, system 102 may be incorporated into charging station management software, allowing EVSE providers to offer energy credit incentives directly to their customers.

The system 102 may also be implemented as an application that electric vehicle users may install on respective user devices. This application may provide real-time information about charging sessions, carbon intensity scores, and accumulated energy credits.

In some embodiments, the system 102 may be managed by an Original Equipment Manufacturer (OEM) of the electric vehicle 104. In this case, the OEM may integrate the system 102 into a vehicle telematics platform, allowing for seamless data collection and credit allocation. The OEM may use this system 102 to incentivize environmentally friendly charging behavior among their customers, potentially as part of a broader sustainability initiative or to meet regulatory requirements related to vehicle emissions. When managed by an OEM, the system 102 may also incorporate vehicle-specific data such as battery capacity, efficiency, and driving patterns to provide more personalized recommendations for optimal charging times and locations.

The electric vehicle 104 may be any type of vehicle that uses electrical energy stored in rechargeable batteries for propulsion. The electric vehicle 104 may be associated with the user 106, who may be the owner or operator of the electric vehicle 104. The electric vehicle 104 may encompass a wide range of vehicle types, including but not limited to battery electric vehicles (BEVs), plug-in hybrid electric vehicles (PHEVs), and fuel cell electric vehicles (FCEVs). BEVs rely solely on electrical energy stored in rechargeable batteries, while PHEVs combine a battery-powered electric motor with an internal combustion engine. FCEVs use hydrogen fuel cells to generate electricity for propulsion. The rechargeable batteries in the electric vehicle 104 may use lithium-ion or other technology which offers high energy density and long cycle life. Such batteries may be charged using various methods, including but not limited to home charging stations, public charging infrastructure, and regenerative braking systems that capture energy during deceleration.

The user 106 associated with the electric vehicle 104 may play a crucial role in the context of the credit and rewards program. As the owner or operator of the electric vehicle 104, the user 106 may be responsible for charging decisions and behaviors that directly impact the vehicle's energy consumption patterns and associated carbon emissions. The user 106 may interact with the system 102 through the user interface 216, making decisions about when and where to charge the electric vehicle 104 based on factors such as carbon intensity scores, energy credit incentives, and personal schedules.

The EVSE 108 may be equipment used for supplying electrical energy to charge the electric vehicle 104. The EVSE 108 may be connected to the power generation source 110, which may provide the electrical energy for charging. The EVSE 108 may serve as an interface between the electric vehicle 104 and the power grid, facilitating the safe and efficient transfer of electrical energy. The EVSE 108 may come in various forms, including wall-mounted chargers, standalone charging stations, and more advanced systems capable of bidirectional power flow.

The connection between the EVSE 108 and the power generation source 110 may be a critical link in the charging infrastructure. This connection may involve various components of the electrical grid, including transformers, substations, and transmission lines. The power generation source 110 may encompass a diverse mix of energy sources, ranging from traditional fossil fuel plants to renewable sources such as solar, wind, and hydroelectric power. In the context of the credit and rewards program, the carbon intensity of the electrical energy supplied for charging may vary depending on the mix of power sources contributing to the grid at any given time. This variability in carbon intensity may be a key factor in determining the environmental impact of each charging session and, consequently, the allocation of energy credits.

The power generation source 110 may include various types of energy sources, such as renewable energy sources (e.g., solar, wind, hydroelectric) or non-renewable energy sources (e.g., coal, natural gas). The type and mix of energy sources may influence the carbon intensity of the electrical power supplied for charging.

The EVSE provider 112 may be an entity that owns, operates, or manages the EVSE 108. The EVSE provider 112 may collect and provide data related to charging sessions, including the quantity of electrical power used and the charging time-period.

The emissions data provider 114 may be a service that provides information about the carbon intensity of electrical power at different times and locations. This information may be used to determine carbon intensity scores for charging sessions.

The energy credits provider 116 may be an entity responsible for allocating and managing energy credits based on the electric vehicle usage data and carbon intensity scores.

The communication network 120 may include a communication medium through which the system 102 may communicate with the electric vehicle 104, the EVSE 108, the EVSE provider 112, the emissions data provider 114, the energy credits provider 116. The communication network 120 may be one of a wired connection or a wireless connection. Examples of the communication network 120 may include, but are not limited to, the Internet, a cloud network, Cellular or Wireless Mobile Network (such as Long-Term Evolution and 5G New Radio), a satellite network (e.g., a network of a set of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 120 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may first determine a vehicle identifier (e.g., VIN number) associated with the electric vehicle 104. By way of example, and not limitation, the vehicle identifier may be prestored in an OEM database or may be retrieved from usage data stored on the electric vehicle 104. In some instances, the determination may be performed each time the electric vehicle 104 connects to the EVSE 108 for charging. This identification process may occur through communication between the electric vehicle 104 and the EVSE 108, or through a separate authentication mechanism implemented by the system 102.

Once the vehicle identifier is determined, the system 102 may initiate the process of retrieving and analyzing data for credit allocation. As part of the process, the system 102 may retrieve usage data from the electric vehicle 104, the EVSE 108, or both. The retrieved usage data may include a plurality of battery charging records for the electric vehicle 104. Each battery charging record of the plurality of battery charging records may include a charging time-period of the electric vehicle 104, a quantity of electrical power used to charge the electric vehicle 104 during the charging time-period, and a geographic location (for example, the geographic location 118) of the electric vehicle 104 during the charging time-period. The system 102 may associate this usage data with the specific vehicle identifier, allowing for accurate tracking and analysis of individual vehicle charging patterns.

In some aspects, the system 102 may determine, based on the usage data, a carbon intensity score for the electrical power consumed during the charging time-period specified in each battery charging record of the plurality of battery charging records. This determination may involve analyzing the retrieved usage data in conjunction with additional information about the carbon intensity of the power grid at the specific time and location of each charging session.

The carbon intensity score may represent the amount of carbon dioxide emissions associated with the generation of the electrical power used for charging. In some implementations, the system 102 may determine the carbon intensity score by considering factors such as the mix of energy sources contributing to the power grid during the charging time-period, the efficiency of power generation and transmission, and any regional variations in power generation methods. To obtain accurate carbon intensity information, the system 102 may communicate with the emissions data provider 114 through the communication network 120. The emissions data provider 114 may supply real-time or historical data on the carbon intensity of the electrical grid for specific geographic of charging sessions and respective time periods of the charging sessions. This data may be used in conjunction with the charging time-period and location information from each battery charging record to determine a precise carbon intensity score for each charging session.

In some cases, the carbon intensity score may be expressed as a numerical value, such as grams of $CO_2$ equivalent per kilowatt-hour of electricity consumed. This standardized measure may allow for easy comparison between different charging sessions and may provide a clear indication of the environmental impact of each charging event. The system 102 may store these calculated carbon intensity scores along with the corresponding battery charging records in the persistent data storage 208.

In accordance with an embodiment, the system 102 may proceed to analyze the retrieved data, considering factors such as the carbon intensity of the power source at the specific time and geographic location of charging. This analysis may form the basis for calculating and allocating energy credits to the user 106 associated with the identified electric vehicle 104. In certain instances, the system 102 may aggregate and process the usage data over extended periods, such as a month or a quarter. By way of example, and not limitation, for a monthly or quarterly analysis, the system 102 may consider factors such as a total energy consumption over the period, an average carbon intensity score for all charging sessions, a distribution of charging times and their corresponding carbon intensity scores, a comparison of carbon intensity scores across different geographic locations, and identification of optimal charging patterns based on historical data.

Based on the usage data and the carbon intensity score, the system 102 may determine an adjusted quantity of electrical power for allocation of energy credits. The system 102 may then transmit a request to the energy credits provider 116 for the allocation of energy credits against the vehicle identifier associated with the electric vehicle 104. In some aspects, the system 102 may consider data on the type of electric vehicle 104 and its battery capacity when determining the allocation of energy credits. This information may be used to tailor the credit allocation based on the specific characteristics of the electric vehicle 104.

Figure 2:
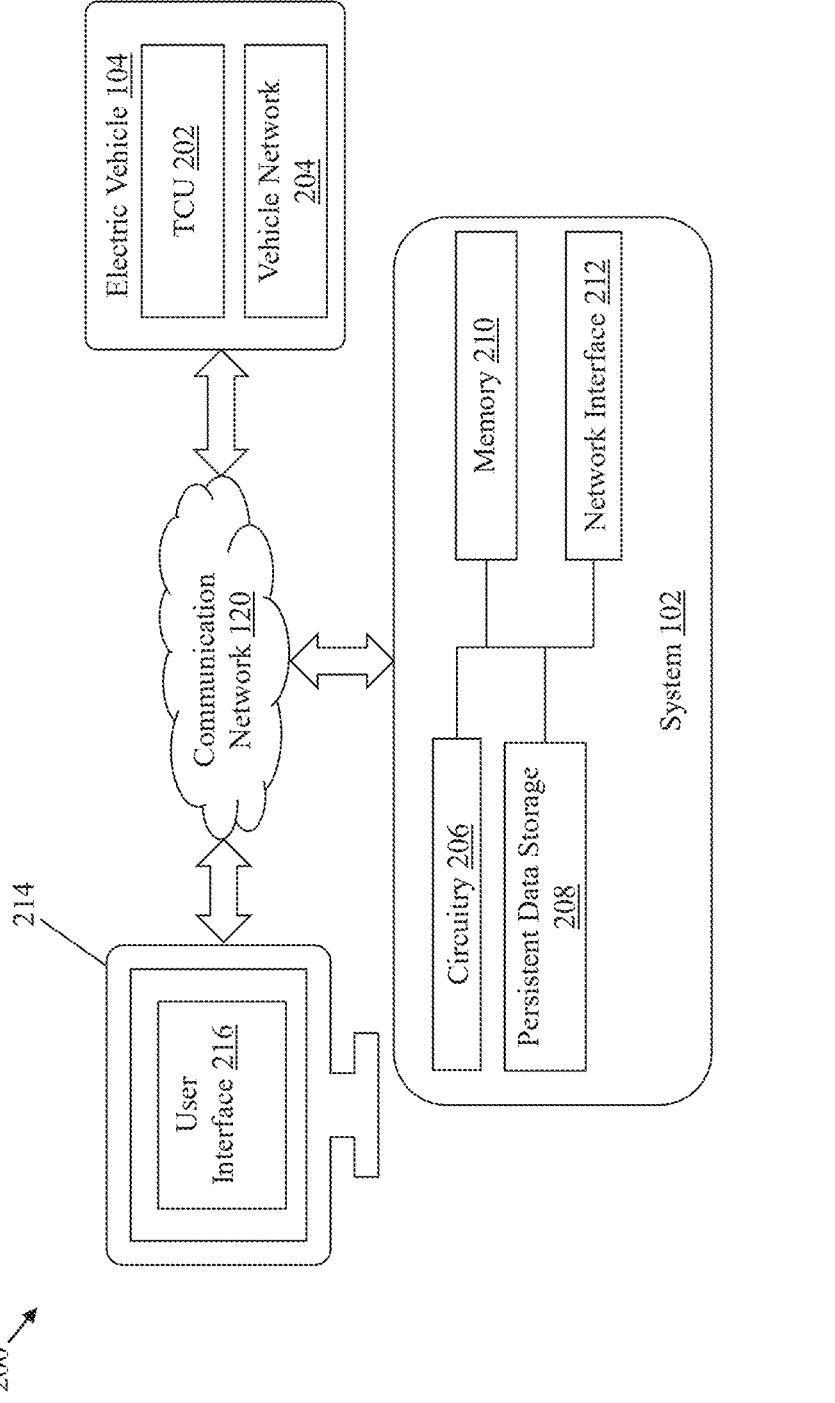
FIG. 2 is a block diagram that illustrates components of a system for managing electric vehicle data and communications, according to aspects of the present disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown a block diagram 200 of an environment that includes the system 102, the electric vehicle 104, and a display device 214. The system 102 may also include or be connected to the display device 214 with a user interface 216. This user interface 216 may allow users, such as electric vehicle owners or system administrators, to interact with the system 102, view data, and manage energy credit allocations. The electric vehicle 104 may include a Telematics Control Unit (TCU) 202 and a vehicle network 204. The system 102 may include circuitry 206, a persistent data storage 208, and a memory 210, a network interface 212.

As used herein, TCU 202 may refer to an electronic device installed in the electric vehicle 104 that collects, processes, and transmits vehicle data. The TCU 202 may include hardware and software components designed to monitor various aspects of the vehicle's operation and performance. In some aspects, the TCU 202 may be connected to the vehicle's onboard diagnostics system and may collect data such as battery charge level, energy consumption, vehicle location, and driving patterns. The TCU 202 may also include communication capabilities, allowing it to transmit collected data to external systems or receive information and commands from remote sources. In some implementations, the TCU 202 may play a crucial role in facilitating the exchange of information between the electric vehicle 104 and the system 102 for managing electric vehicle data and communications.

The vehicle network 204 may include a medium through which the various control units, components, and/or systems of the electric vehicle 104 may communicate with each other. In accordance with an embodiment, in-vehicle communication of audio/video data may occur by use of Media Oriented Systems Transport (MOST) multimedia network protocol of the vehicle network 204 or other suitable network protocols for vehicle communication. The MOST-based network may be a separate network from the controller area network (CAN). The MOST-based network may use a plastic optical fiber (POF) medium. In accordance with an embodiment, the MOST-based network, the CAN, and other in-vehicle networks may co-exist in a vehicle, such as the electric vehicle 104. The vehicle network 204 may facilitate access control and/or communication between the circuitry 206 and other ECUs, such as ECM or TCU 202 of the electric vehicle 104.

Various devices or components in the electric vehicle 104 may connect to the vehicle network 204, in accordance with various wired and wireless communication protocols. Examples of the wired and wireless communication protocols for the vehicle network 204 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I2C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The circuitry 206 may include suitable logic, control circuitry, and interfaces that may be configured to execute program instructions associated with different operations to be executed by the system 102. The circuitry 206 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 206 may be implemented based on a number of processor technologies known in the art. Examples of implementations of the circuitry 206 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

As used herein, the term "persistent data storage 208" may refer to a non-volatile storage system or device capable of retaining data even when power is removed. In some aspects, the persistent data storage 208 may include solid-state drives (SSDs), hard disk drives (HDDs), or other forms of long-term data storage media. The persistent data storage 208 may be used to store various types of information, such as user profiles, vehicle data, charging records, carbon intensity scores, and energy credit allocations. In some implementations, the persistent data storage 208 may be accessed by the circuitry 206 to retrieve or update stored information as needed for system operations.

The memory 210 may include suitable logic, control circuitry, and interfaces that may be configured to store the one or more instructions to be executed by the circuitry 206. The memory 210 may be capable of reading and writing data at high speeds, facilitating quick retrieval and manipulation of information by the system's processing units. In some implementations, the memory 210 may be used to hold data structures, variables, and program instructions that are frequently accessed during the execution of software applications or system operations. The memory 210 may work in conjunction with other components, such as the persistent data storage 208, to manage the flow of information within the system 102. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 212 may include suitable logic, control circuitry, and interfaces that may be configured to facilitate communication between the system 102 and other entities such as the electric vehicle 104 and the display device 214, via the communication network 120. The network interface 212 may be implemented by use of various known technologies to support wired or wireless communication of the system 102 with the communication network 120. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control circuitry. The network interface 212 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation New Radio (5G NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

As used herein, the term "display device 214" may refer to an output device capable of visually presenting information to a user. The display device 214 may include, but is not limited to, liquid crystal displays (LCDs), light-emitting diode (LED) displays, organic light-emitting diode (OLED) displays, plasma display panels, or other types of electronic visual display technologies. In some aspects, the display device 214 may be integrated into a larger system, such as a smartphone, tablet, computer monitor, or vehicle dashboard. The display device 214 may be configured to render various types of information, including text, graphics, images, and video content. In some implementations, the display device 214 may be touch-sensitive, allowing for user input through direct interaction with the displayed interface elements.

The functions or operations executed by the system 102, as described in FIG. 1, may be performed by the circuitry 206. Operations executed by the circuitry 206 are described in detail, for example, in FIG. 3, FIG. 4A, FIG. 4B, and FIG. 5.

Figure 3:
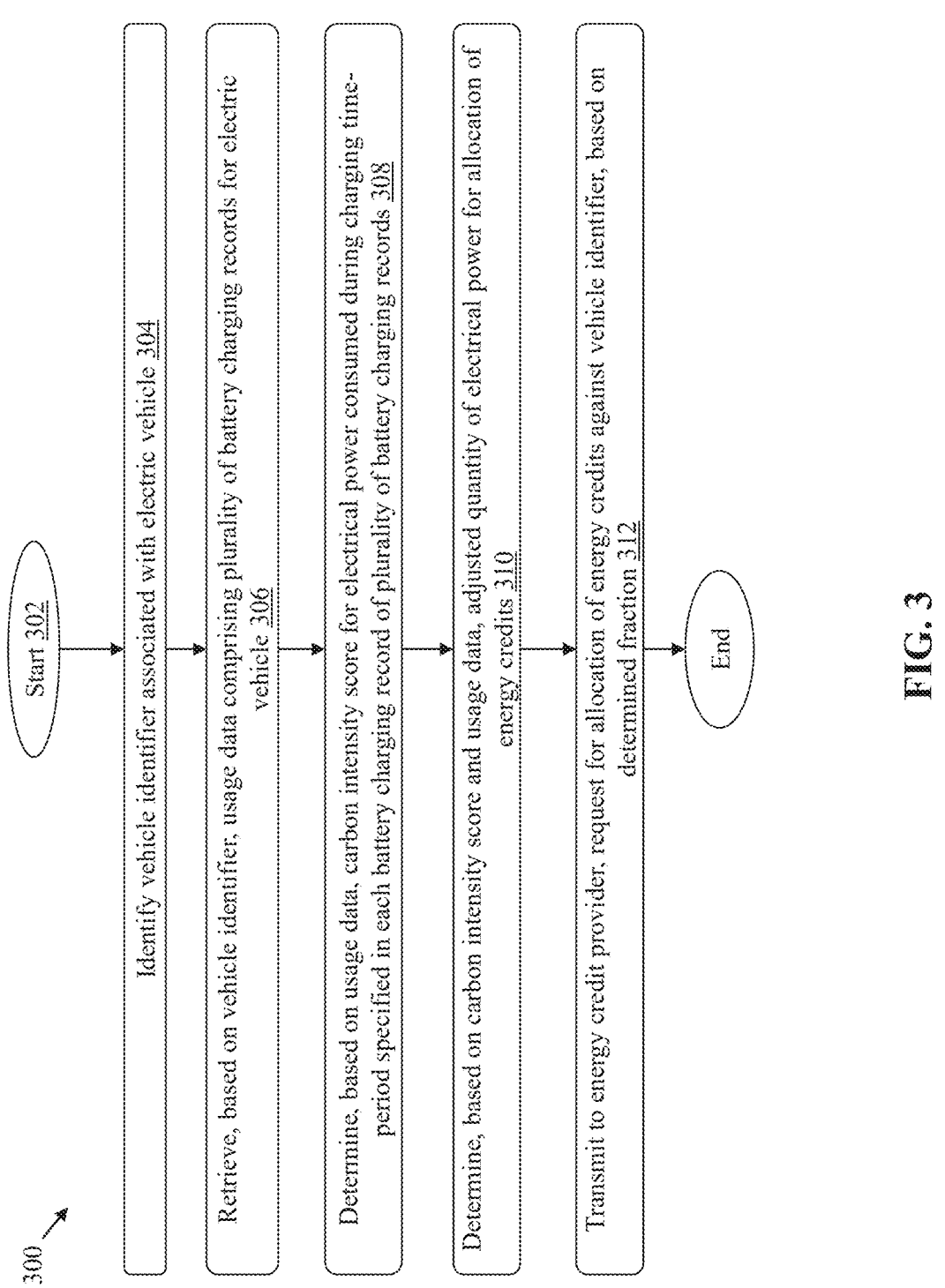
FIG. 3 is a flowchart that illustrates a process for allocating energy credits based on electric vehicle usage data, in accordance with an embodiment of the disclosure.

FIG. 3 is a flowchart that illustrates a process for allocating energy credits based on electric vehicle usage data, in accordance with an embodiment of the disclosure. FIG. 3 is explained in conjunction with elements from FIG. 1 and FIG. 2. With reference to FIG. 3, there is shown a flowchart 300 representing a process for allocating energy credits based on electric vehicle usage data. The process may begin at 302 and proceed to 304.

At 304, a vehicle identifier associated with the electric vehicle 104 may be identified. The vehicle identifier may be a unique alphanumeric code, such as a Vehicle Identification Number (VIN), that distinguishes the electric vehicle 104 from other vehicles. In some aspects, the system 102 may retrieve this identifier through wireless communication with the electric vehicle 104, by querying a database stored in the persistent data storage 208, or through other suitable means.

At 306, usage data including a plurality of battery charging records for the electric vehicle 104 may be retrieved based on the vehicle identifier. The usage data may be obtained from various sources, such as the TCU 202 of the electric vehicle 104 or the EVSE 108 associated with the EVSE provider 112. In some cases, the usage data may be transmitted to the system 102 through the communication network 120.

Each battery charging record of the plurality of battery charging records may include a charging time-period of the electric vehicle 104, a quantity of electrical power used to charge the electric vehicle 104 during the charging time-period, and a geographic location of the electric vehicle 104 during the charging time-period.

At 308, a carbon intensity score may be determined for the electrical power consumed during the charging time-period specified in each battery charging record of the plurality of battery charging records based on the usage data. The carbon intensity score may be a measure of the amount of carbon dioxide emissions associated with the generation of the electrical power used for charging. In some aspects, this determination may involve communicating with an emissions data provider 114 to obtain carbon intensity information for the specific time and location of each charging session.

At 310, an adjusted quantity of the electrical power may be determined for allocation of energy credits, based on the carbon intensity score and the usage data. This step may involve calculating the adjusted quantity of electrical power used during charging based on both the environmental impact of that power, as indicated by the carbon intensity score, and the specific usage data for each charging session. In some cases, charging sessions that occur during periods of lower carbon intensity may result in a larger adjusted quantity of electrical power being eligible for energy credit allocation.

For example, consider the following scenarios:

1. An electric vehicle charges for 2 hours, consuming 20 kWh of electricity. During this time, the carbon intensity score is 400 g $CO_2$/kWh. The system 102 may calculate an adjusted quantity of 18 kWh for energy credit allocation, accounting for the relatively high carbon intensity.

2. The same electric vehicle charges for 2 hours, consuming 20 kWh of electricity, but during a period when the carbon intensity score is 200 g $CO_2$/kWh. In this case, the system 102 may calculate an adjusted quantity of 22 kWh for energy credit allocation, rewarding the user for charging during a cleaner energy period.

3. A different electric vehicle with a larger battery capacity charges for 4 hours, consuming 40 kWh of electricity. The carbon intensity score varies during this period, such as 300 g CO2/kWh for first 2 hours and 150 g CO2/kWh for Last 2 hours. The system 102 may calculate an adjusted quantity by weighting each hour differently, potentially resulting in an adjusted quantity of 43 kWh for energy credit allocation.

4. An electric vehicle charges multiple times throughout a day, such as 10 kWh in Morning (high demand) with a carbon intensity of 500 g CO2/kWh, 15 kWh in Afternoon (solar peak) with a carbon intensity 100 g CO2/kWh, 5 kWh in Evening (moderate demand) with a carbon intensity 300 g CO2/kWh. The system 102 may calculate adjusted quantities for each session separately and sum them up, potentially resulting in a total adjusted quantity of 35 kWh for energy credit allocation, despite only 30 kWh being actually consumed.

In such examples, the system 102 may incentive charging during periods of lower carbon intensity by adjusting the quantity of electrical power eligible for energy credits. This approach may encourage users to shift their charging behavior to times when the grid is relying more heavily on cleaner energy sources.

At 312, a request for the allocation of the energy credits against the vehicle identifier may transmitted to the energy credit provider 116, based on the adjusted quantity. This request may include details such as the vehicle identifier, the adjusted quantities of electrical power for each charging session, and the relevant time periods and locations.

The flowchart 300 illustrates a systematic approach to allocating energy credits based on both the quantity of electrical power consumed and the environmental impact of that consumption. By considering factors such as carbon intensity, this process may incentivize electric vehicle users to charge their vehicles during periods when cleaner energy sources are more prevalent in the power grid.

In some aspects, the system 102 may perform additional steps or variations of the described steps. For example, the system 102 may collect and consider data on the type of electric vehicle 104 and its battery capacity when determining the allocation of energy credits. This information may be used to tailor the credit allocation based on the specific characteristics of the electric vehicle 104.

The process described in flowchart 300 may be executed by the circuitry 206 of the system 102, based on computer-executable instructions stored in the persistent data storage 208. The results of this process, such as the allocated energy credits, may be displayed to the user 106 through the user interface 216 on the display device 214, providing transparency and encouraging continued participation in the energy credit program. Further details related to the response of the request is provided in detail, for example, in FIGS. 4A and 4B.

Although the flowchart 300 is illustrated as discrete operations, such as 302, 304, 306, 308, 310, and 312, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 4A:
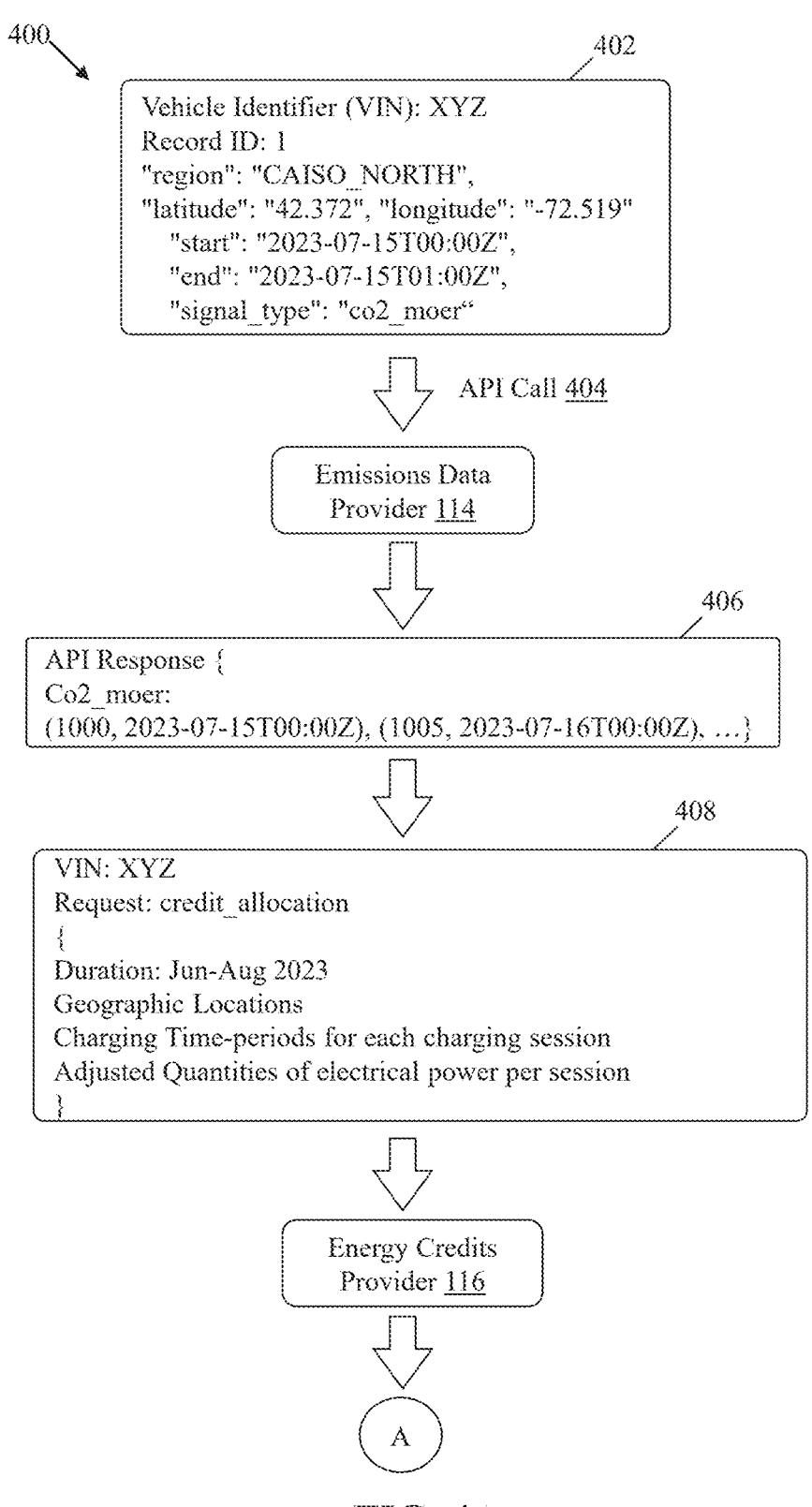
FIGS. 4A and 4B collectively illustrate a scenario diagram for a process of allocating energy credits based on electric vehicle usage data and carbon intensity information, according to aspects of the present disclosure.
Figure 4B:
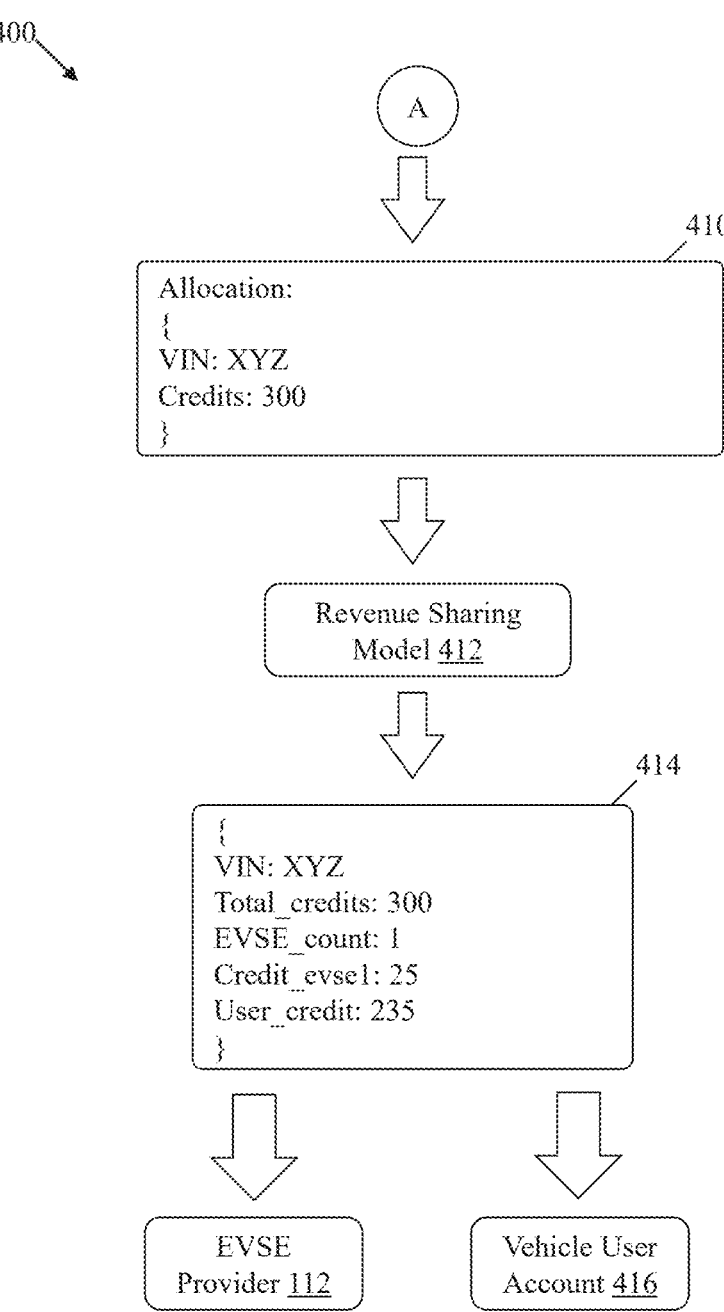

FIGS. 4A and 4B collectively illustrate a scenario diagram for a process of allocating energy credits based on electric vehicle usage data and carbon intensity information, according to aspects of the present disclosure. FIGS. 4A and 4B are explained in conjunction with elements from FIG. 1, FIG. 2, and FIG. 3. With reference to FIGS. 4A and 4B, scenario diagram 400 for a process of allocating energy credits is illustrated.

The process may begin with usage data 402, which may include details about an electric vehicle charging session. In some aspects, the usage data 402 may include a vehicle identifier (VIN), record ID, geographic location (latitude and longitude), start and end times of the charging session, and the type of measurement (e.g., "co2_moer", i.e., marginal operating emissions rate (MOER) of CO2). Each battery charging record within the usage data 402 may include a charging time-period of the electric vehicle 104, a quantity of electrical power used to charge the electric vehicle 104 during the charging time-period, and a geographic location of the electric vehicle 104 during the charging time-period.

Following the retrieval of usage data 402, the system 102 may transmit an Application Programming Interface (API) call 404 to the emissions data provider 114. The API call 404 may include relevant information from the usage data 402, such as the geographic location of the electric vehicle 104 and the charging time-period. This step may allow the system 102 to obtain carbon intensity information for the specific time and location of the charging session.

In response to the API call 404, the emissions data provider 114 may send an API response 406. The API response 406 may contain CO2 measurements for different time intervals, providing the carbon intensity data for the charging period. The system 102 may receive this API response 406, which includes the carbon intensity score for the electrical power consumed during the charging time-period.

Based on the usage data 402 and the carbon intensity information from the API response 406, the system 102 may determine an adjusted quantity of the electrical power for allocation of energy credits. This adjustment may consider both the quantity of electrical power used and the environmental impact of that power consumption, as indicated by the carbon intensity score.

Following this determination, the system 102 may generate a credit request 408. The credit request 408 may include various parameters such as the vehicle identifier (VIN), the duration of the credit allocation period, geographic locations, charging time-periods for each charging session, and adjusted quantities of electrical power per session. This credit request 408 may represent the request for the allocation of energy credits against the vehicle identifier, based on the adjusted quantity of electrical power.

The credit request 408 may then be transmitted to an energy credits provider 116, which may process the request for energy credit allocation. This transmission may complete the process of retrieving usage data, obtaining carbon intensity information, and generating a credit request based on the adjusted quantity of electrical power.

The energy credits provider 116 may process this credit request 408 and allocate the appropriate number of credits to the vehicle identifier. In some embodiments, the system 102 may receive energy credits against the vehicle identifier from the energy credit provider 116 based on the request. These credits may be stored in the persistent data storage 208 and associated with the specific vehicle identifier for future use or redemption.

In accordance with an embodiment, the system 102 may determine the EVSE provider 112 of the electrical power in the charging time-period based on the usage data and the vehicle identifier. This determination may involve analyzing the charging location data and cross-referencing it with a database of EVSE providers stored in the persistent data storage 208. Thereafter, the system 102 may allocate a portion of the energy credits to the EVSE provider 112 based on a revenue sharing model 412. The revenue sharing model 412 may be used to determine how the credits are distributed between different parties involved in the electric vehicle charging ecosystem. The allocation may consider factors such as the number of charging sessions facilitated by the EVSE provider 112, the total amount of electrical power supplied, and the overall contribution to the clean energy ecosystem. By way of example, and not limitation, for a total credit allocation 410 of 300 credits against VIN "XYZ", the system 102 may determine an allocation 414 in which the EVSE provider 112 may receive 25 credits for the EVSE usage, and the user 106 may be awarded 235 credits. As shown, for example, a total of 235 credits may be credited to a vehicle user account 416.

In some aspects, the energy credits may include renewable energy credits (RECs). RECs may represent the environmental attributes of electricity generated from renewable sources. By allocating RECs to electric vehicle users, the system 102 may encourage the use of renewable energy for charging and support the broader adoption of clean energy technologies.

In accordance with an embodiment, the request for the allocation of energy credits may be transmitted based on the determined power generation source. In some implementations, the system 102 may determine whether the electrical power used for charging was generated from renewable or non-renewable energy sources. This determination may influence the number of credits allocated or the type of credits (e.g., RECs vs. standard credits) assigned to the vehicle identifier.

The revenue sharing model 412 may be flexible and adaptable to different scenarios. For example, in some cases, the model may allocate a fixed percentage of credits to the EVSE provider 112 for each charging session. In other cases, the allocation may be based on a tiered system, where EVSE providers 112 that facilitate a higher number of charging sessions or supply more clean energy may receive a larger percentage of credits.

In some embodiments, the system 102 may transmit the request for the allocation of energy credits based on the type of the electric vehicle 104 and the battery capacity of the electric vehicle 104. This approach may allow for a more nuanced credit allocation system that considers the specific characteristics of different electric vehicle models. For instance, the system 102 may consider the efficiency of the electric vehicle 104 when allocating credits. Electric vehicles with higher efficiency ratings may receive a larger allocation of credits for the same amount of electrical power consumed. Similarly, the battery capacity of the electric vehicle 104 may influence the credit allocation. Vehicles with larger battery capacities may be capable of storing more clean energy and thus may be eligible for additional credits.

The type of electric vehicle 104 may also be considered in terms of its overall environmental impact. For example, electric vehicles manufactured using sustainable practices or materials may be eligible for bonus credits. This approach may encourage automotive manufacturers to adopt more environmentally friendly production methods.

In some aspects, the revenue sharing model 412 may extend beyond EVSE providers to include other partners in the electric vehicle ecosystem. For instance, partnerships may be established with commercial entities such as supermarkets or shopping centers that host charging stations. These partners may receive a portion of the energy credits or other incentives for promoting and facilitating clean energy charging.

The system 102 may also incorporate dynamic pricing models into the revenue sharing structure. For example, during periods of high demand for charging or when the power grid is relying more heavily on renewable energy sources, the allocation of credits may be adjusted to incentivize charging during these optimal times.

By incorporating these various factors into the credit allocation and revenue sharing process, the system 102 may create a comprehensive and flexible framework that encourages the adoption of electric vehicles, the development of charging infrastructure, and the use of clean energy sources.

In some aspects, the system 102 may incorporate additional features to enhance the analysis and optimization of electric vehicle charging behavior. For instance, the system 102 may record, for each battery charging record, a distance driven by the electric vehicle 104 using the electrical power from the corresponding charging session. This information may be used to calculate a carbon intensity per mile driven based on the carbon intensity score of the electrical power used for charging and the distance driven using that electrical power. By tracking this metric, the system 102 may provide users with a more comprehensive understanding of their vehicle's environmental impact. For example, a user may charge the electric vehicle with 100% renewable energy, resulting in a carbon intensity score of 0.05 lbs $CO_2$/kWh. The user may drive 100 miles using the charge. The same user may then charge the electric vehicle at a different location with a carbon intensity score of 0.8 lbs $CO_2$/kWh and drive 50 miles using this charge. By tracking these metrics, the system 102 may calculate that the first 100 miles are driven with a carbon intensity of 0.0005 lbs $CO_2$/mile and the next 50 miles are driven with a carbon intensity of 0.016 lbs $CO_2$/mile. This level of detail may allow for more precise miles driven/carbon intensity records, providing the user with a comprehensive understanding of the electric vehicle's environmental impact across different charging scenarios and driving distances.

In some aspects, the system 102 may generate a cumulative carbon intensity report that includes multiple charging sessions and corresponding driving distances. This report may indicate the carbon intensity per mile for different combinations of charging sources and the driving distances, allowing the user 106 to identify patterns and optimize their charging and driving behavior for reduced environmental impact.

The system 102 may also retrieve pricing information for a plurality of EVSE locations and determine a location-based carbon intensity score for each of such locations. The system 102 may generate charging recommendations for the user 106 of the electric vehicle 104 based on both the pricing information and carbon intensity scores of the EVSE locations. For instance, consider the following scenario:

1. EVSE Location A: $0.15/kWh, carbon intensity score of 0.6 lbs $CO_2$/kWh
2. EVSE Location B: $0.18/kWh, carbon intensity score of 0.3 lbs $CO_2$/kWh
3. EVSE Location C: $0.12/kWh, carbon intensity score of 0.9 lbs $CO_2$/kWh The system 102 may recommend Location B to a user who prioritizes lower carbon emissions, while recommending Location C to another user who prioritizes lower costs. This feature may help the users make informed decisions about where and when to charge the electric vehicles, balancing cost and environmental considerations. Additionally, the system 102 may transmit the charging recommendations to EVSE providers (such as the EVSE provider 112) associated with the plurality of EVSE locations. This information sharing may encourage the EVSE providers to procure renewable energy sources and improve carbon intensity scores of the respective EVSE providers.

In some aspects, the system 102 may further control the display device 214 associated with the electric vehicle 104 to render, on the user interface 216, real-time information for EVSE locations that may be proximal to a current location of the electric vehicle 104. This feature may provide the user 106 with up-to-date, location-specific information to make informed decisions about where and when to charge the electric vehicle 104. The user interface 216 may render the real-time information for nearby EVSE locations, including a price per kilowatt-hour for the EVSE locations at the current time and a location-based carbon intensity score for each of the EVSE locations. The score may reflect the current mix of energy sources supplying power to each EVSE location. The real-time information may also include an option to select one of the EVSE locations with the location-based carbon intensity score that is below a threshold score. For example, consider a scenario where an electric vehicle user may drive in an urban area and battery charge of the electric vehicle may be low. The display device 214 in the electric vehicle may show the following information:

EVSE Location 1 (0.5 miles away):
Price: $0.14/kWh
Carbon Intensity: 0.4 lbs CO2/kWh
EVSE Location 2 (1.2 miles away):
Price: $0.16/kWh
Carbon Intensity: 0.2 lbs CO2/kWh
EVSE Location 3 (0.8 miles away):
Price: $0.15/kWh
Carbon Intensity: 0.3 lbs CO2/kWh In this scenario, if the system 102 has set a carbon intensity threshold of 0.35 lbs CO2/kWh, both Location 2 and Location 3 may be highlighted as options with carbon intensity scores below the threshold. The user may then choose between such locations based on a preferences for price, distance, or lowest carbon intensity.

The system 102 may update the information in real-time, reflecting changes in pricing or carbon intensity. For instance, if a nearby solar farm begins contributing more power to the grid, the carbon intensity scores of the EVSE locations may decrease, potentially offering more low-carbon charging options to the user.

Figure 5:
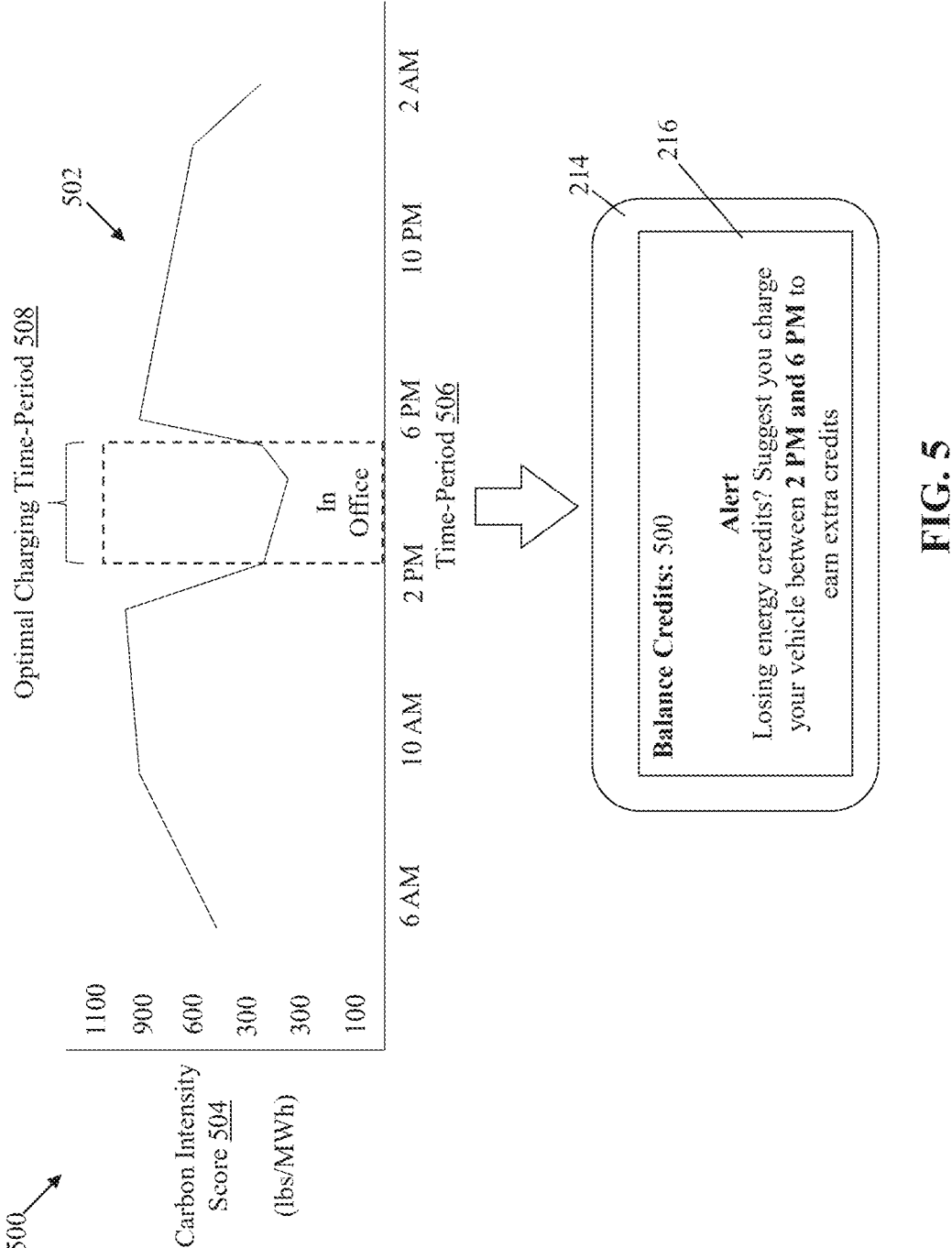
FIG. 5 is a scenario diagram that illustrates a system for optimizing electric vehicle charging based on carbon intensity scores, according to aspects of the present disclosure.

FIG. 5 is a scenario diagram that illustrates a system for optimizing electric vehicle charging based on carbon intensity scores, according to aspects of the present disclosure. FIG. 5 is explained in conjunction with elements from FIG. 1, FIG. 2, FIG. 3, and FIGS. 4A and 4B. With reference to FIG. 5, there is shown a scenario diagram 500 of the system 102 for optimizing electric vehicle charging based on carbon intensity scores. The scenario diagram 500 may include a display device 214 showing a user interface 216, and a graph 502 depicting carbon intensity scores over time.

The system 102 may determine a carbon intensity score for the electrical power consumed during each charging time-period based on the usage data. The carbon intensity score may be represented by the carbon intensity score 504 on the y-axis of the graph 502, measured in lbs/MWh. The x-axis of the graph 502 may represent the time-period 506, which in this case spans from 6 AM to 2 AM the following day.

The carbon intensity score may be determined based on the geographic location of the electric vehicle 104 and the charging time-period in which the electric vehicle 104 is at the geographic location. This locational and temporal specificity may allow for a more accurate representation of the environmental impact of charging at different times and places.

In some aspects, the carbon intensity score may measure an operating emissions rate (OER) for the power generation source 110 that generates the electrical power in the charging time-period. The OER may represent the amount of carbon dioxide emitted per unit of electricity generated. Similarly, the carbon intensity score may measure an operating emissions rate (OER) for a power generation entity that generates the electrical power in the charging time-period. This entity may be a specific power plant or a regional power grid, for example.

The graph 502 may show fluctuations in the carbon intensity score 504 throughout the day. These fluctuations may reflect changes in the mix of power generation sources contributing to the grid at different times. For example, periods with higher solar or wind power generation may correspond to lower carbon intensity scores.

Based on the carbon intensity scores, the system 102 may identify an optimal charging time-period 508. In the illustrated example, this period occurs between 2 PM and 6 PM and is labeled "In Office". This optimal charging time-period 508 may correspond to a significant dip in the carbon intensity score 504, indicating a period when charging would have a lower environmental impact.

The user interface 216 on the display device 214 may present information derived from this analysis. In some cases, the system 102 may control the display device 214 associated with a user of the electric vehicle 104 to display flexible charging options for the electric vehicle 104. These options may be displayed based on a schedule of the user 106 and the carbon intensity score for each time-period of a plurality of time-periods in the schedule. For example, if the user 106 typically charges the electric vehicle 104 overnight, the system 102 may suggest alternative charging times during the day when carbon intensity is lower.

In the illustrated example, the user interface 216 shows a balance of 500 credits and an alert message. The alert may inform the user 106 that they may be losing energy credits and suggest charging the vehicle between 2 PM and 6 PM to earn extra credits. This recommendation may align with the optimal charging time-period 508 identified in the graph 502.

In some implementations, the flexible charging options may include an optimal charging time-period for which the carbon intensity score is below a threshold score. This threshold may be determined based on various factors, such as average carbon intensity scores for the region or specific goals for reducing carbon emissions.

By providing this information through the user interface 216, the system 102 may encourage users to adjust their charging behavior to align with periods of lower carbon intensity. This approach may not only help users maximize their energy credits but also contribute to reducing the overall carbon footprint associated with electric vehicle charging.

The system 102 may control the display device 214 associated with the user 106 of the electric vehicle 104 to render information on the user interface 216. In some aspects, the rendered information may include at least one of a charging behavior of the user 106, an analysis of the usage data, the received energy credits, and an impact of the charging behavior on carbon emissions.

For example, the user interface 216 may display a graph showing the user's charging patterns over time, highlighting periods when the user has charged during low carbon intensity periods. This visualization may help users understand their charging behavior and its environmental impact. The user interface 216 may also present an analysis of the usage data, such as average charging duration, frequency of charging sessions, and total energy consumed.

In some implementations, the user interface 216 may show the current balance of energy credits received by the user 106, as illustrated in the scenario diagram 500 where a balance of 500 credits is displayed. This information may be updated in real-time as the user accumulates or redeems credits.

The impact of the charging behavior on carbon emissions may be presented through various metrics. For instance, the user interface 216 may display the estimated reduction in carbon emissions achieved by charging during low carbon intensity periods, or the potential additional reduction that could be achieved by optimizing charging schedules.

To further assist the user 106 in making informed decisions, the user interface 216 may provide predictive information about future carbon intensity scores. This may allow the user 106 to plan charging sessions in advance, considering both their schedule and expected grid conditions.

In some implementations, the system 102 may offer automated charging options. The user 106 may set conditions for charging times and carbon intensity thresholds, and the system 102 may automatically initiate charging when such conditions are met. This may help the user 106 optimize their charging behavior without requiring constant manual intervention.

In some implementations, the user interface 216 may also render comparative information, showing how the user's charging behavior and carbon emissions compare to averages for similar electric vehicle models or users in the same geographic area. By providing a comprehensive and interactive interface, the system 102 may empower users to make more informed decisions about their electric vehicle charging, potentially leading to more efficient energy use and reduced carbon emissions.

In some aspects, the system 102 may consider the Scope 3 emissions associated with the OEM's vehicles when allocating energy credits. Scope 3 emissions refer to indirect emissions that occur in a company's value chain, including those from the use of sold products. For electric vehicles, this primarily relates to the emissions associated with charging and operating the vehicles.

The system 102 may be configured to track and analyze the charging patterns and energy consumption of electric vehicles 104 associated with specific OEMs. This data may be used to calculate the Scope 3 emissions attributable to each OEM's fleet of electric vehicles. By incorporating this information into the credit allocation process, the system 102 may incentivize OEMs to promote more efficient and environmentally friendly charging behaviors among their customers.

The system 102 may establish business relationships with various stakeholders to enhance the effectiveness and reach of the credit program. In some aspects, the system 102 may be configured to interface with the EVSE provider 112 to access detailed charging data and VIN information. This collaboration may enable more accurate tracking of charging sessions and credit allocation.

In some cases, the system 102 may form partnerships with commercial entities such as supermarkets, shopping centers, or workplace parking facilities. These partnerships may involve installing charging stations at these locations and offering additional incentives for users who charge the electric vehicles at partner locations. For example, users may earn bonus credits or receive discounts on goods or services when they charge at a partner supermarket.

The system 102 may be programmed to manage these partnerships, including tracking usage at partner locations, calculating additional incentives, and facilitating the exchange of data between the system 102 and partner entities. This may involve developing APIs or other integration methods to ensure seamless data flow and credit allocation.

In some implementations, the system 102 may collaborate with utility companies to align the credit program with broader grid management strategies. This may involve incorporating real-time grid demand data into the carbon intensity calculations, encouraging users to charge during off-peak hours or when renewable energy generation is high.

Various embodiments of the disclosure may provide a non-transitory computer-readable medium and/or storage medium having stored thereon, computer-executable instructions executable by a machine and/or a computer to operate a system (for example, a system 102 of FIG. 1) for credit allocation. Such instructions may cause the system 102 to perform operations that may include identifying a vehicle identifier associated with an electric vehicle and retrieving usage data comprising a plurality of battery charging records for the electric vehicle based on the vehicle identifier. Each battery charging record of the plurality of battery charging records may include a charging time-period of the electric vehicle, a quantity of electrical power used to charge the electric vehicle during the charging time-period, and a geographic location of the electric vehicle during the charging time-period. The operations may further include determining a carbon intensity score for the electrical power consumed during the charging time-period specified in each battery charging record of the plurality of battery charging records based on the usage data. The operation may further include determining an adjusted quantity of the electrical power for allocation of energy credits based on the carbon intensity score and the usage data and transmitting to an energy credit provider, a request for the allocation of the energy credits against the vehicle identifier, based on the adjusted quantity.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system, comprising:
   vehicle charging circuitry that includes a telematics control interface, a network interface, and a power delivery interface, the circuitry configured to:
   identify, via the telematics control interface, a vehicle identifier associated with an electric vehicle;
   retrieve, based on the vehicle identifier, usage data comprising a plurality of battery charging records for the electric vehicle,
      wherein each battery charging record of the plurality of battery charging records comprises a charging time-period of the electric vehicle, a quantity of electrical power used to charge the electric vehicle during the charging time-period, and a geographic location of the electric vehicle during the charging time-period;
   determine, based on the usage data and emissions intensity information received from an external emissions data provider, a first carbon intensity score for the electrical power consumed during the charging time-period specified in each battery charging record of the plurality of battery charging records, wherein the first carbon intensity score corresponds to an amount of carbon dioxide emitted based on the charge of the electric vehicle;
   generate and transmit, via the power delivery interface, a charging control signal to a charging relay, inverter, or rectifier of an electric vehicle supply equipment (EVSE) controller, the charging control signal automatically initiating or adjusting at least one physical charging parameter of the EVSE including charging current, charging voltage, or a duty cycle of power delivery based on a determination that the charging time period and the first carbon intensity score are below a first threshold;
   determine, based on the first carbon intensity score and the usage data after the charging of the electric vehicle is initiated, an adjusted quantity of the electrical power for allocation of energy credits; and
   transmits to an energy credit provider, a request for the allocation of the energy credits against the vehicle identifier, based on the adjusted quantity.

2. The system according to claim 1, wherein the usage data is retrieved from at least one of a Telematics Control Unit (TCU) of the electric vehicle or the Electric Vehicle Supply Equipment (EVSE) associated with an EVSE provider.

3. The system according to claim 1, wherein the first carbon intensity score is determined further based on the geographic location of the electric vehicle and the charging time-period in which the electric vehicle is at the geographic location.

4. The system according to claim 1, wherein the circuitry further:
   transmits an Application Programming Interface (API) call to an emissions data provider, wherein the API call includes the geographic location of the electric vehicle and the charging time-period; and
   receives an API response that includes the first carbon intensity score.

5. The system according to claim 1, wherein the first carbon intensity score measures an operating emissions rate (OER) for a power generation source that generates the electrical power in the charging time-period.

6. The system according to claim 1, wherein the circuitry further determines a power generation source of the electrical power consumed during the charging time-period as one of a renewable energy source or a non-renewable energy source, and wherein the request for the allocation of the energy credits is transmitted further based on the power generation source.

7. The system according to claim 1, wherein the circuitry further receives, from the energy credit provider, the energy credits against the vehicle identifier based on the request.

8. The system according to claim 7, wherein the circuitry further controls a display device associated with a user of the electric vehicle to render, on a user interface, information that includes at least one of a charging behavior of the user, an analysis of the usage data, the received energy credits, and an impact of the charging behavior on carbon emissions.

9. The system according to claim 7, wherein the circuitry further:
   determines, based on the usage data and the vehicle identifier, the Electric Vehicle Supply Equipment (EVSE) provider of the electrical power in the charging time-period; and
   allocates a portion of the energy credits to the EVSE provider based on a revenue sharing model.

10. The system according to claim 1, wherein the circuitry further:
   records, for each battery charging record of the plurality of battery charging records, a distance driven by the electric vehicle using the electrical power; and
   calculates a carbon intensity per mile driven based on the first carbon intensity score of the electrical power and the distance driven using the electrical power.

11. The system according to claim 10, wherein the circuitry further generates a cumulative carbon intensity report that includes multiple charging sessions and driving distances corresponding to the multiple charging sessions, wherein
   the cumulative carbon intensity report indicates the carbon intensity per mile for different combinations of charging sources and the driving distances.

12. The system according to claim 1, wherein the circuitry further:
   retrieves pricing information for a plurality of EVSE locations;
   determines a location-based carbon intensity score for each of the plurality of EVSE locations; and
   generates charging recommendations for a user of the electric vehicle based on the pricing information and the location-based carbon intensity score for each of the plurality of EVSE locations.

13. The system according to claim 12, wherein the circuitry further transmits the charging recommendations to EVSE providers associated with the plurality of EVSE locations.

14. The system according to claim 1, wherein the circuitry further controls a display device associated with the electric vehicle to render, on a user interface, real-time information for EVSE locations that are proximal to a current location of the electric vehicle, the real-time information comprising at least one of:

a price per kilowatt-hour for the EVSE locations at a current time;

a location-based carbon intensity score for each of the EVSE locations; and an option to select one of the EVSE locations with a current carbon intensity score that is below a second threshold score.

15. The system according to claim 1, wherein the circuitry further collects data on a type of the electric vehicle and a battery capacity of the electric vehicle.

16. The system according to claim 15, wherein the circuitry further transmits the request for the allocation of the energy credits based on the type of the electric vehicle and the battery capacity of the electric vehicle.

17. The system according to claim 1, wherein the circuitry further controls a display device associated with a user of the electric vehicle to display flexible charging options for the electric vehicle, wherein the flexible charging options are displayed based on a schedule of the user and a second carbon intensity score for each time-period of a plurality of time-period in the schedule.

18. The system according to claim 17, wherein the flexible charging options include an optimal charging time-period for which the second carbon intensity score is below a third threshold.

19. A method of a system that includes electric vehicle charging control circuitry having a telematics control interface and a power delivery interface, the method comprising:

identifying, by the circuitry via the telematics control interface, a vehicle identifier associated with an electric vehicle;

retrieving, by the circuitry and based on the vehicle identifier, usage data comprising a plurality of battery charging records for the electric vehicle, wherein each battery charging record of the plurality of battery charging records comprises a charging time-period of the electric vehicle, a quantity of electrical power used to charge the electric vehicle during the charging time-period, and a geographic location of the electric vehicle during the charging time-period;

receiving, by the circuitry via a network interface, emissions intensity information for the geographic location from an external emissions data provider;

determining, by the circuitry and based on the usage data and the emissions intensity information, a carbon intensity score for the electrical power consumed during the charging time-period specified in each battery charging record of the plurality of battery charging records, wherein the calculation is based on the usage data, and the carbon intensity score corresponds to an amount of carbon dioxide emitted based on the charge of the electric vehicle;

generating and transmitting, by the circuitry via the power delivery interface, a charging control signal to a charging relay, inverter, or rectifier of an electric vehicle supply equipment (EVSE) controller, the charging control signal automatically initiating or adjusting at least one physical charging parameter of the EVSE, including charging current, charging voltage, or a duty cycle of power delivery, based on a determination that the charging time period and the carbon intensity score are below a threshold, thereby dynamically modifying charging operations of the electric vehicle in real time based on grid conditions;

determining, by the circuitry and based on the carbon intensity score and the usage data after the charging of the electric vehicle is initiated, an adjusted quantity of the electrical power for allocation of energy credits; and transmitting, by the circuitry, to an energy credit provider, a request for the allocation of the energy credits against the vehicle identifier, based on the adjusted quantity.

20. A non-transitory computer-readable medium having stored thereon, computer-executable instructions that when executed by electric vehicle charging control circuitry including a telematics control interface, a network interface, and a power delivery interface, cause the circuitry to perform operations, the operations comprising:

identifying, via the telematics control interface, a vehicle identifier associated with an electric vehicle;

retrieving, based on the vehicle identifier, usage data comprising a plurality of battery charging records for the electric vehicle based on the vehicle identifier, wherein each battery charging record of the plurality of battery charging records comprises a charging time-period of the electric vehicle, a quantity of electrical power used to charge the electric vehicle during the charging time-period, and a geographic location of the electric vehicle during the charging time-period;

receiving, via a network interface, emissions intensity information for the geographic location from an external emissions data provider;

determining, based on the usage data and the emissions intensity information, a carbon intensity score for the electrical power consumed during the charging time-period specified in each battery charging record of the plurality of battery charging records, wherein the carbon intensity score corresponds to an amount of carbon dioxide emitted based on the charge of the electric vehicle;

generating and transmitting, via the power delivery interface, a charging control signal to a charging relay, inverter, or rectifier of an electric vehicle supply equipment (EVSE) controller, the charging control signal automatically initiating or adjusting at least one physical charging parameter of the EVSE, including charging current, charging voltage, or a duty-cycle of power delivery, based on a determination that the charging time-period and the carbon intensity score are below a threshold, thereby dynamically modifying charging operations of the electric vehicle in real time based on grid conditions;

determining, based on the carbon intensity score and the usage data after the charging of the electric vehicle is initiated, an adjusted quantity of the electrical power for allocation of energy credits; and transmitting to an energy credit provider, a request for the allocation of the energy credits against the vehicle identifier, based on the adjusted quantity.

* * * * *